(12) United States Patent
Ganis

(10) Patent No.: US 10,288,101 B2
(45) Date of Patent: May 14, 2019

(54) STRUTS AND METHODS UTILIZING A LOCKING COLLAR NUT

(71) Applicant: Goodrich Corporation, Charlotte, NC (US)

(72) Inventor: Rony Giovanni Ganis, Oakville (CA)

(73) Assignee: Goodrich Corporation, Charlotte, NC (US)

( * ) Notice: Subject to any disclaimer, the term of this patent is extended or adjusted under 35 U.S.C. 154(b) by 300 days.

(21) Appl. No.: 15/386,803

(22) Filed: Dec. 21, 2016

(65) Prior Publication Data

US 2017/0102024 A1 Apr. 13, 2017

Related U.S. Application Data

(62) Division of application No. 14/293,631, filed on Jun. 2, 2014, now Pat. No. 9,568,040.

(51) Int. Cl.
*F16B 7/02* (2006.01)
*F16B 7/18* (2006.01)
(Continued)

(52) U.S. Cl.
CPC ............... *F16B 7/025* (2013.01); *B64C 1/06* (2013.01); *F16B 7/182* (2013.01); *F16C 7/02* (2013.01);
(Continued)

(58) Field of Classification Search
CPC .. F16C 3/026; F16C 3/023; F16C 7/02; F16D 1/06; F16D 1/064; F16D 1/068;
(Continued)

(56) References Cited

U.S. PATENT DOCUMENTS 1,076,921 A 10/1913 Stafford
2,404,142 A 7/1946 Parker
(Continued)

FOREIGN PATENT DOCUMENTS

DE 29520478 2/1996
DE 102013008810 A1 12/2013
(Continued)

OTHER PUBLICATIONS

Requirement for Restriction/Election filed U.S. Appl. No. 14/293,631 dated Oct. 8, 2015.
(Continued)

*Primary Examiner* — Matthieu F Setliff
(74) *Attorney, Agent, or Firm* — Snell & Wilmer, L.L.P

(57) ABSTRACT

A method of manufacture may comprise disposing a locking collar nut at least partially around a composite tube, wherein the composite tube comprises a variable diameter portion comprising a first frustoconical portion and a second frustoconical portion, wherein a diameter of the composite tube at an interface between the first frustoconical portion and the second frustoconical portion is a maximum diameter value with respect to the first frustoconical portion and is a maximum diameter value with respect to the second frustoconical portion, disposing a locking wedge at least partially around the first frustoconical portion, disposing an end fitting at least partially around the second frustoconical portion, and coupling the locking collar nut with the end fitting, wherein the locking collar nut circumferentially surrounds the locking wedge disposed around the first frustoconical portion.

2 Claims, 10 Drawing Sheets

(51) Int. Cl.
*F16C 7/02* (2006.01)
*B64C 1/06* (2006.01)
*F16C 11/06* (2006.01)

(52) U.S. Cl.
CPC ...... *F16C 11/0695* (2013.01); *F16C 2326/43* (2013.01)

(58) Field of Classification Search
CPC ... F16D 1/09; F16D 1/092; F16D 1/08; F16D 1/0817; F16D 1/0829; F16D 1/0841; F16D 1/0864; F16D 1/087; F16D 1/0878; F16D 1/0882; F16D 1/0888; F16D 2001/0903; F16L 19/005; F16L 19/025; F16B 7/025; F16B 7/182
See application file for complete search history.

(56) References Cited

U.S. PATENT DOCUMENTS

| | | |
|---|---|---|
| 4,647,078 A | 3/1987 | Lundy |
| 4,802,695 A | 2/1989 | Weinhold |
| 6,945,569 B1 | 9/2005 | Diaz et al. |
| 7,335,108 B2 | 2/2008 | Lin et al. |
| 8,414,724 B2 | 4/2013 | Schnelz |
| 8,430,759 B2 | 4/2013 | Wanthal |
| 2015/0345673 A1 | 12/2015 | Ganis |

FOREIGN PATENT DOCUMENTS

| | | |
|---|---|---|
| EP | 365391 | 2/1992 |
| GB | 1182914 A | 3/1970 |
| WO | WO2004027305 | 4/2004 |

OTHER PUBLICATIONS

Non-Final Office Action filed in U.S. Appl. No. 14/293,631 dated Feb. 8, 2016.
Final Office Action filed in U.S. Appl. No. 14/293,631 dated Jun. 8, 2016.
Advisory Action issued in U.S. Appl. No. 14/293,631 dated Aug. 24, 2016.
Notice of Allowance issued in U.S. Appl. No. 14/293,631 dated Oct. 3, 2016.
Notice of Allowance issued in U.S. Appl. No. 14/293,631 dated Nov. 9, 2016.
Extended European Search Report dated Oct. 23, 2015 in European Application No. 15169892.5.
European Patent Office, European Office Action dated Oct. 12, 2018 in Application No. 15169892.5.
USPTO, Pre-Interview First Office Action dated Dec. 18, 2018 in U.S. Appl. No. 15/386,849.

STRUTS AND METHODS UTILIZING A LOCKING COLLAR NUT

CROSS-REFERENCE TO RELATED APPLICATIONS

This application is a divisional of, and claims priority to, and the benefit of U.S. Ser. No. 14/293,631 filed Jun. 2, 2014, and entitled "STRUTS AND METHODS UTILIZING A LOCKING COLLAR NUT" which is incorporated by reference herein in its entirety.

FIELD

The present disclosure relates to composite tube assemblies and methods of manufacture of composite tube assemblies.

BACKGROUND

Composite tubes are often used due to their high strength and low weight in industries where weight is a significant factor, such as in the aircraft and automotive industry (e.g., a strut). Composite tubes often comprise fibers and/or filaments reinforced with thermosets and/or thermoplastics. Conventional composite tube assemblies typically may have a metallic end fitting bonded to a composite tube and, thus, may hinder reuse of the metallic end fittings when replacing a composite tube.

SUMMARY

A method of manufacture is disclosed herein, in accordance with various embodiments. In various embodiments, a method of manufacture may comprise disposing a locking collar nut at least partially around a composite tube, wherein the composite tube comprises a variable diameter portion comprising a first frustoconical portion and a second frustoconical portion, wherein a diameter of the composite tube at an interface between the first frustoconical portion and the second frustoconical portion is a maximum diameter value with respect to the first frustoconical portion and is a maximum diameter value with respect to the second frustoconical portion, disposing a locking wedge at least partially around the first frustoconical portion, disposing an end fitting at least partially around the second frustoconical portion, and coupling the locking collar nut with the end fitting, wherein the locking collar nut circumferentially surrounds the locking wedge disposed around the first frustoconical portion.

In various embodiments, the locking collar nut may be threadedly engaged to the end fitting. The method of manufacture may further comprise coupling a locking key to the locking collar nut and the end fitting. The method of manufacture may further comprise coupling a jam nut to the end fitting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

Figure 1:
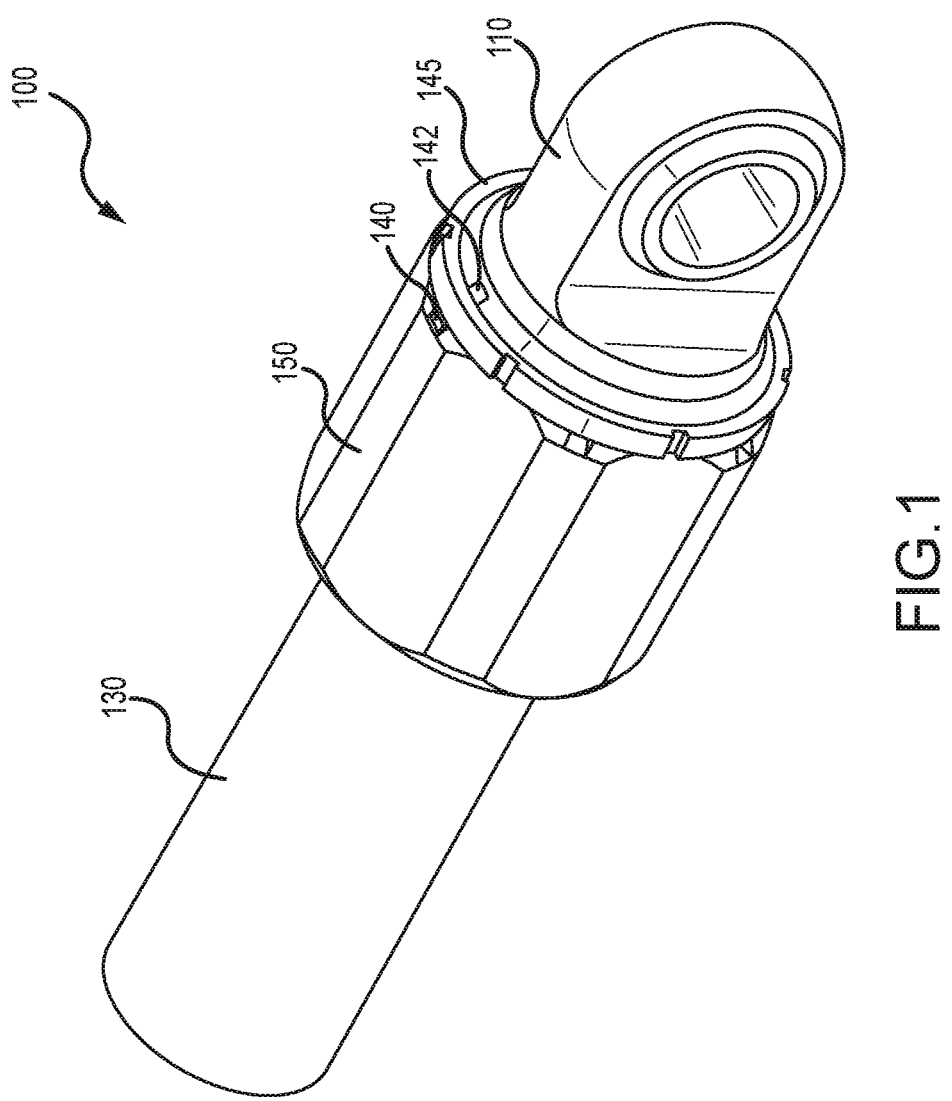
FIG. 1 illustrates a composite tube assembly, in accordance with various embodiments.
Figure 6:
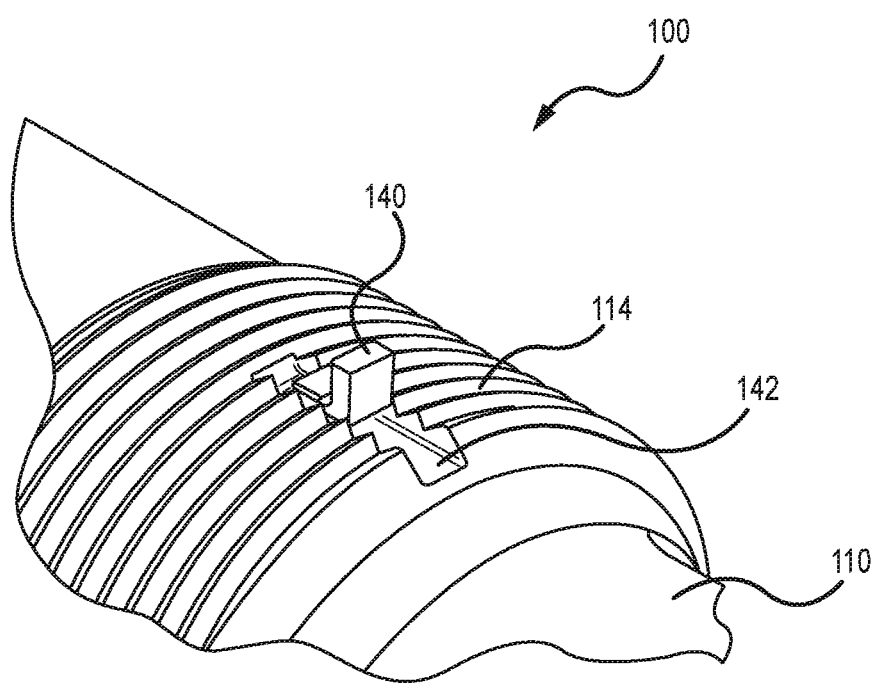
FIG. 6 illustrates a composite tube assembly, in accordance with various embodiments.

With reference to FIG. 1, a composite tube assembly 100, in accordance with various embodiments, is illustrated. Composite tube assembly 100 may comprise a composite tube 130, a locking collar nut 150, and an end fitting 110. According to various embodiments, as illustrated in FIGS. 1 and 6, composite tube assembly 100 may comprise a locking key 140 disposed in keyway 142 of end fitting 110. In various embodiments, the locking key 140 may be coupled to locking collar nut 150 and, thus, may aid in securing locking collar nut 150 to end fitting 110.

For example, with temporary reference to FIG. 6, composite tube assembly 100 is illustrated with the locking collar nut 150 removed for improved clarity. In various embodiments locking key 140 may be disposed in keyway 142 of end fitting 110. In various embodiments, locking key 140 may prevent rotation of locking collar nut 150 (shown in FIG. 1) on threads 114 of end fitting 110. Thus, in various embodiments, after locking collar nut 150 is coupled (e.g., threadedly engaged) to the end fitting 110, locking key 140 may be disposed in keyway 142. Thus, according to various embodiments, locking key 140 may aid in securing (e.g., preventing the rotation of) locking collar nut 150 with respect to end fitting 110.

In various embodiments and with reference to FIG. 1, composite tube assembly 100 may comprise a jam nut 145 circumferentially disposed around end fitting 110. Thus, in various embodiments, the relative placement of end fitting 110, locking collar nut 150, and jam nut 145, may aid in coupling locking key 140 to locking collar nut 150. According to various embodiments, jam nut 145 may be threadedly engaged to the end fitting 110. Thus, in various embodiments and as illustrated in FIG. 1, the locking key 140 may be secured in keyway 142 of end fitting 110 due to the placement of the jam nut 145 and the locking collar nut 150.

According to various embodiments, composite tube 130 may comprise lightweight polymer-matrix composite ("PMC") materials to utilize the anisotropic properties of the PMC material. As used herein, PMC materials may include carbon-fiber-reinforced polymers, such as carbon-fiber-reinforced plastics and carbon-fiber reinforced thermoplastics. As used herein, the term "carbon-fiber-reinforced polymer" may include any material that comprises a fibrous material network (such as a network of carbon fiber) and a polymer, such as graphite epoxy. According to various embodiments, the PMC material may comprise any fibers. For example, in various embodiments, PMC materials may comprise aramid fibers and/or para-aramid, such as Kevlar®, a registered mark of the E. I. Du Pont de Nemours and Company, Nomex®, also a registered mark of the E. I. Du Pont de Nemours and Company, and Technora®, a registered mark of the Teijin Corporation.

According to various embodiments, the end fitting 110 is not particularly limited. According to various embodiments, the end fitting 110 may comprise at least one of a clevis, a single bearing lug, or other geometries for end fittings. In various embodiments, the end fitting 110 may comprise various materials, for example, a metal. Exemplary metals according to various embodiments include at least one of aluminum, tungsten, titanium, nickel, molybdenum, steel, cobalt, chromium, or alloys thereof. For example, according to various embodiments, the end fitting 110 may comprise various steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

In various embodiments, the locking collar nut 150 is not particularly limited. In various embodiments, the locking collar nut 150 may comprise various materials, for example, a metal. Exemplary metals according to various embodiments include at least one of aluminum, tungsten, titanium, nickel, molybdenum, steel, cobalt, chromium, or alloys thereof. For example, according to various embodiments, the locking collar nut 150 may comprise various materials, for example, steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

Figure 2A:
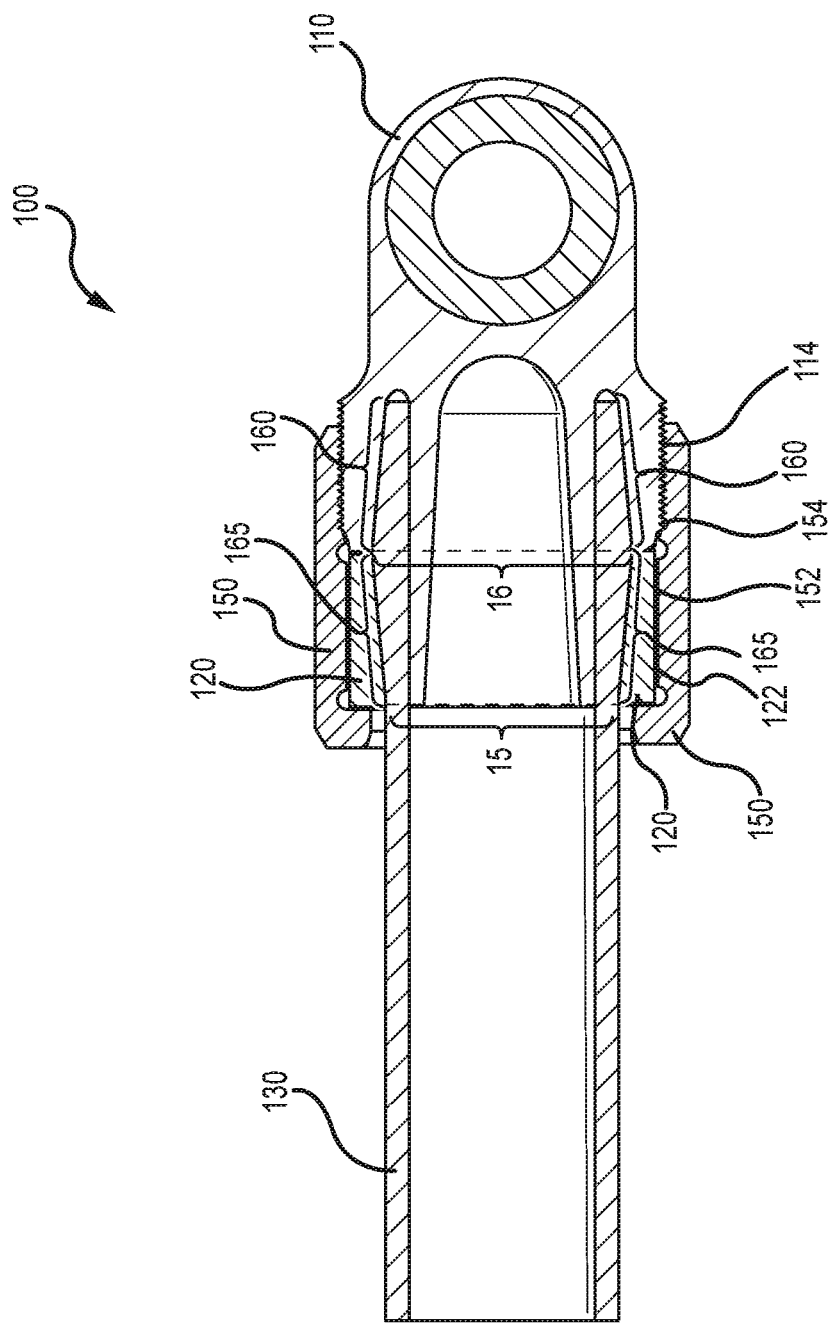
FIG. 2A illustrates a cross-sectional view of a composite tube assembly, in accordance with various embodiments.
Figure 2B:
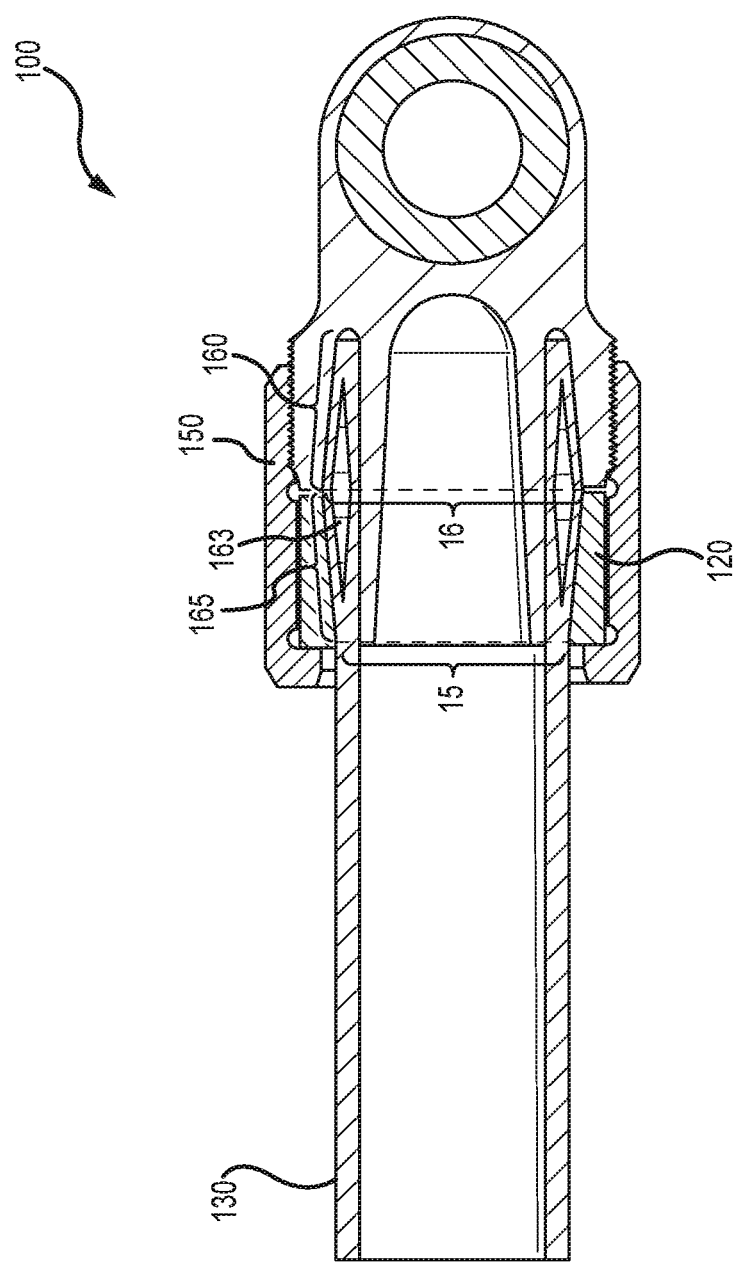
FIG. 2B illustrates a cross-sectional view of a composite tube assembly, in accordance with various embodiments.

With reference to FIGS. 2A and 2B, various cross-sectional views of composite tube assembly 100, in accordance with various embodiments, are illustrated. As can be seen in FIGS. 2A and 2B, composite tube assembly 100 may comprise a composite tube 130 comprising a variable diameter portion comprising a first frustoconical portion 165 and a second frustoconical portion 160. According to various embodiments, and as illustrated in FIGS. 2A and 2B, a diameter of the composite tube 130 at an interface between the first frustoconical portion 165 and the second frustoconical portion 160 may have a maximum diameter value (illustrated with diameter 16) with respect to the first frustoconical portion 165 and may have a maximum diameter value with respect to the second frustoconical portion 160. For example, with continued reference to FIGS. 2A and 2B, maximum diameter 16 of first frustoconical portion 165 may be greater than another diameter of first frustoconical portion 165 (illustrated with diameter 15).

In various embodiments, an outer surface of the first frustoconical portion 165 and the second frustoconical portion 160 may be surface treated with any methods of surface treatment for PMC materials (e.g., nanocoated, coated with polytetrafluoroethylene ("PTFE"), coated with a metallic thermal spray, etc.). As used herein, the term "nanocoated" is not particularly limited and may include any methods of coating PMC materials with nanomaterials, while the term "nanomaterials" refers to a material comprised of particles that have at least one dimension between $3.93700787 \cdot 10^{-8}$ inches (1 nanometer) and $3.93700787 \; 10^{-5}$ inches (1,000 nanometers). According to various embodiments, various nanocoatings may increase the resistance of the composite tube 130 against frictional wear, such as frictional wear from end fitting 110.

With temporary reference to FIG. 2B, a composite tube assembly 100 according to various embodiments is illustrated. According to various embodiments, the first frustoconical portion 165 and second frustoconical portion 160 of composite tube 130 may comprise a metallic insert 163. In various embodiments the metallic insert 163 may be bonded to the composite tube 130 (e.g., with an adhesive). In various embodiments, metallic insert 163 may be co-molded with the composite tube 130. In various embodiments, the metallic insert 163 may be co-cured with the composite tube 130. Accordingly, in various embodiments, the metallic insert 163 may be both co-molded and co-cured with the composite tube 130. As used herein, the term "co-curing" may include simultaneous curing of the composite material with the metallic insert. As used herein, co-molded may include being joined in the same mold. For example, in various embodiments, a metallic insert that is both co-molded and co-cured may be joined in the same mold at the same time with the same epoxy and simultaneously cured with the composite tube. Various adhesives may be used to bond and/or co-cure the metallic insert 163 to the composite tube 130 and, thus, in various embodiments, the adhesive is not limited. For example, in various embodiments, the adhesive may include any adhesive suitable for PMC materials, such as an epoxy adhesive. An exemplary epoxy adhesive, according to various embodiments, may include Epovex®, commercially available from Zyvex Performance Materials, Incorporated.

Moreover, the metallic insert 163 is not particularly limited, and may comprise at least one of aluminum, tungsten, titanium, nickel, molybdenum, steel, cobalt, chromium, or alloys thereof. For example, according to various embodiments, the metallic insert 163 may comprise various steel alloys, such as high strength low alloy steel ("HSLA") that is commercially known as 300M, and/or high strength steel, such as Aermet® 100, a registered trademark of the Carpenter Technology Corporation, and/or titanium alloys, such as Ti 6Al-4V, commercially available from the Titanium Metal Corporation as Ti 6Al-4V ELI.

With reference back to both FIGS. 2A and 2B, in various embodiments, the locking wedge 120 may disposed at least partially around a circumference of the first frustoconical portion 165. In various embodiments, a locking collar nut 150 may be disposed at least partially around a circumference of the locking wedge 120. According to various embodiments, an outer surface 122 of locking wedge 120 may be configured to be tightly secured by inner surface 152 of locking collar nut 150, as shown in FIG. 2A. In various embodiments, composite tube assembly 100 may comprise an end fitting 110 at least partially around a circumference of the second frustoconical portion 160. In various embodiments, end fitting 110 may be coupled to the locking collar nut 150. According to various embodiments, the end fitting 110 may be threadedly engaged with the locking collar nut 150. For example, threads 154 of locking collar nut 150 may be configured to engage with the corresponding threads 114 of end fitting 110, as shown in FIG. 2A.

Figure 3:
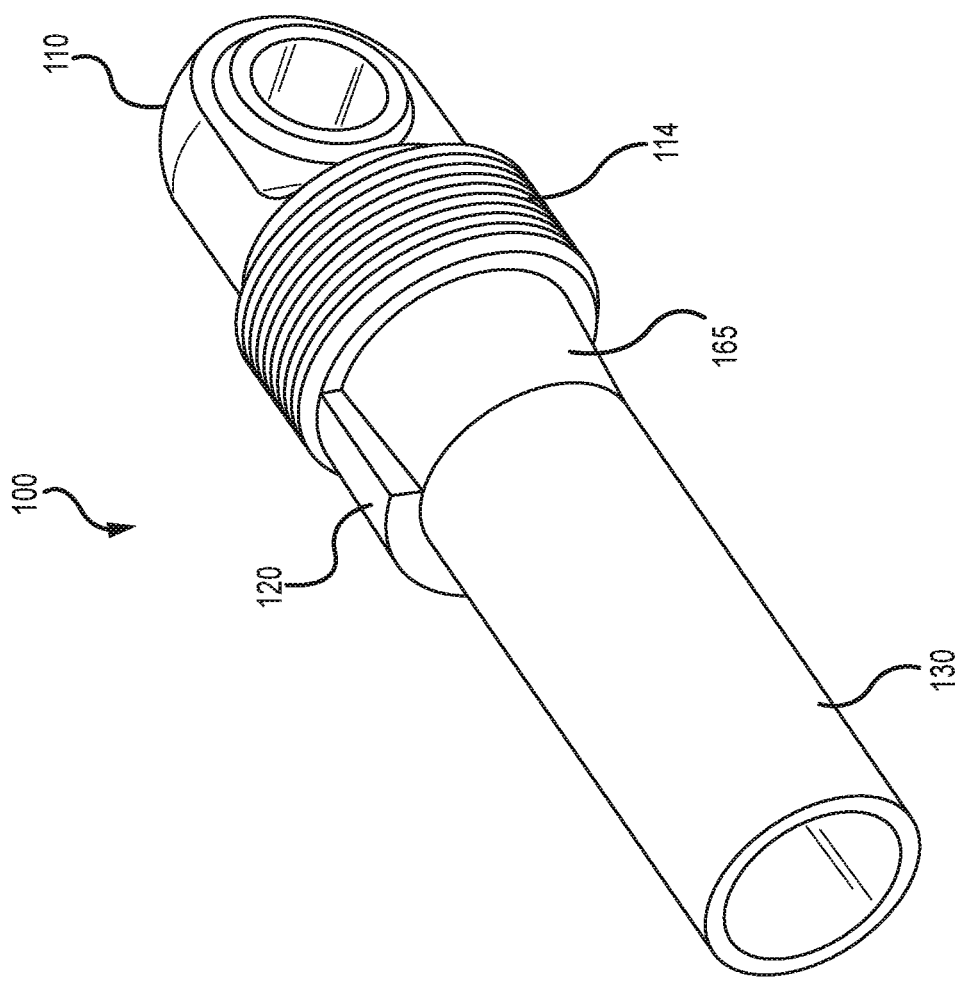
FIG. 3 illustrates a view of a composite tube assembly, in accordance with various embodiments.

In various embodiments, the locking wedge 120 is not particularly limited. For example, in various embodiments, the locking wedge 120 may comprise a single, integral piece. As used herein, the term "integrated" or "integral" may include forming a single continuous piece. In various embodiments, locking wedge 120 may comprise a plurality of subcomponents (e.g., two halves of a locking wedge). For example, in various embodiments, the locking wedge 120 may comprise two pieces that were separately manufactured. For example, with reference to FIG. 3, composite tube assembly 100 is illustrated with one half of the locking wedge 120 removed and, thus, illustrates locking wedge 120 disposed at least partially around a circumference of the first frustoconical portion 165 of composite tube 130, while proximate to end fitting 110 and threads 114.

With reference back to FIG. 2A, according to various embodiments, locking collar nut 150 may help secure the locking wedge 120 around the first frustoconical portion 165. For example, in various embodiments the locking collar nut 150 may help to retain various axial loads that may try to separate the locking wedge 120 from first frustoconical portion 165.

Figure 4:
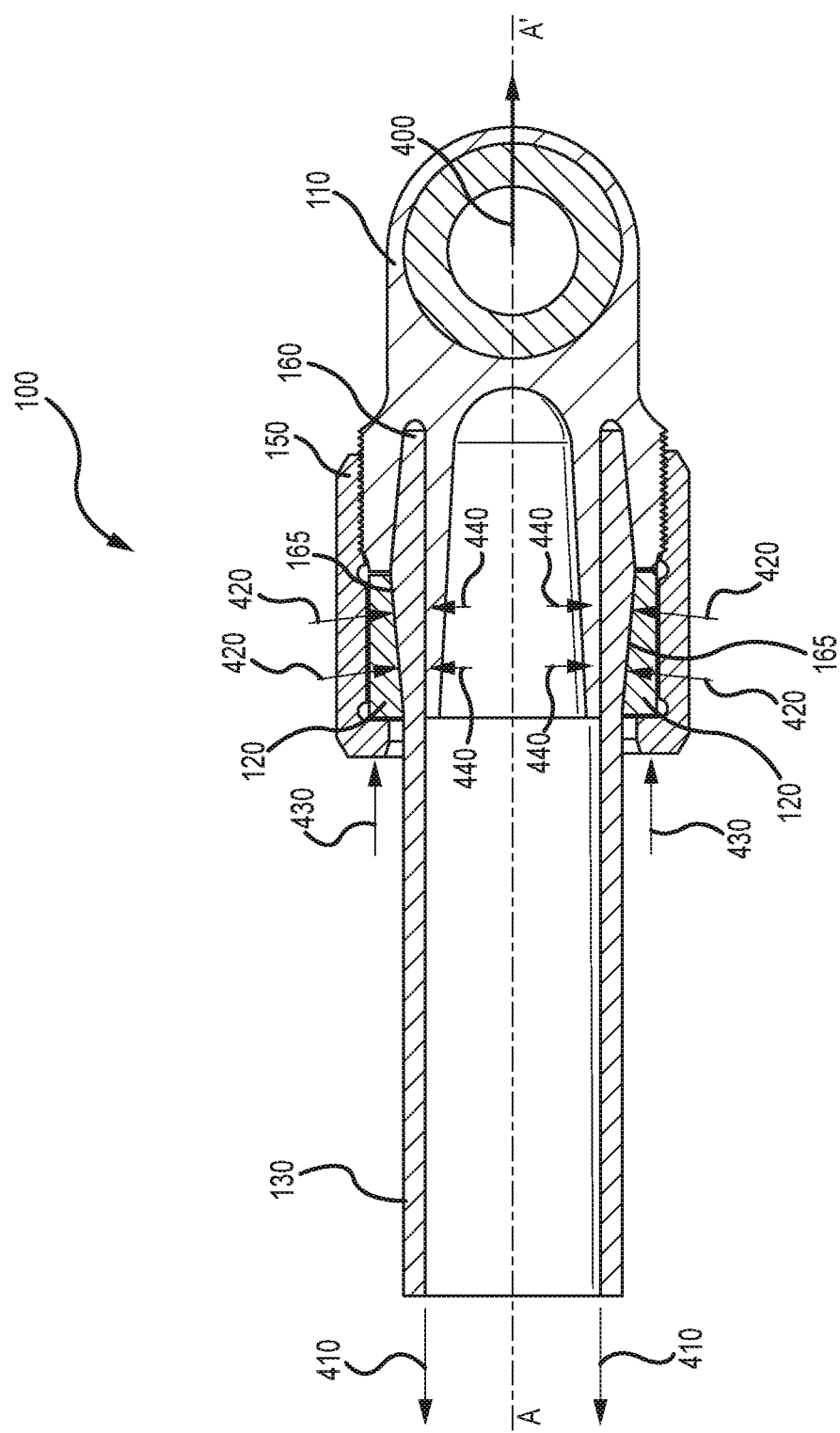
FIG. 4 illustrates a cross-sectional view of a composite tube assembly under a tensile load, in accordance with various embodiments.

For example, with reference to FIG. 4, a composite tube assembly 100 under a tensile load 400 in accordance with various embodiments is illustrated. In various embodiments, in response to tensile load 400 applied to end fitting 110, a longitudinal tensile load 430 on locking collar nut 150 may arise. The longitudinal tensile load 430 on locking collar nut 150 may exert a radially compressive force 420 on locking wedge 120 disposed around the first frustoconical portion 165 due to the configuration of locking collar nut 150 and end fitting 110. As used herein, the term "radially" may include a direction primarily directed towards and/or away from a longitudinal axis of the composite tube 130. For example, in various embodiments a radially compressive force 420 may be primarily directed towards axis A-A' and, thus, may not necessarily be orthogonal to axis A-A' shown in FIG. 4.

In various embodiments, due to the configuration of first frustoconical portion 165 and locking wedge 120, longitudinal tensile load 430 may exert a radially outward load 440 on locking wedge 120. Accordingly, the radially compressive force 420 and the radially outward load 440 may cause hoop stress on the first frustoconical portion 165. In turn, longitudinal tensile load 410 may result on the composite tube 130. In various embodiments, the composite tube 130 may react to tensile load 400 applied to end fitting 110.

Figure 5:
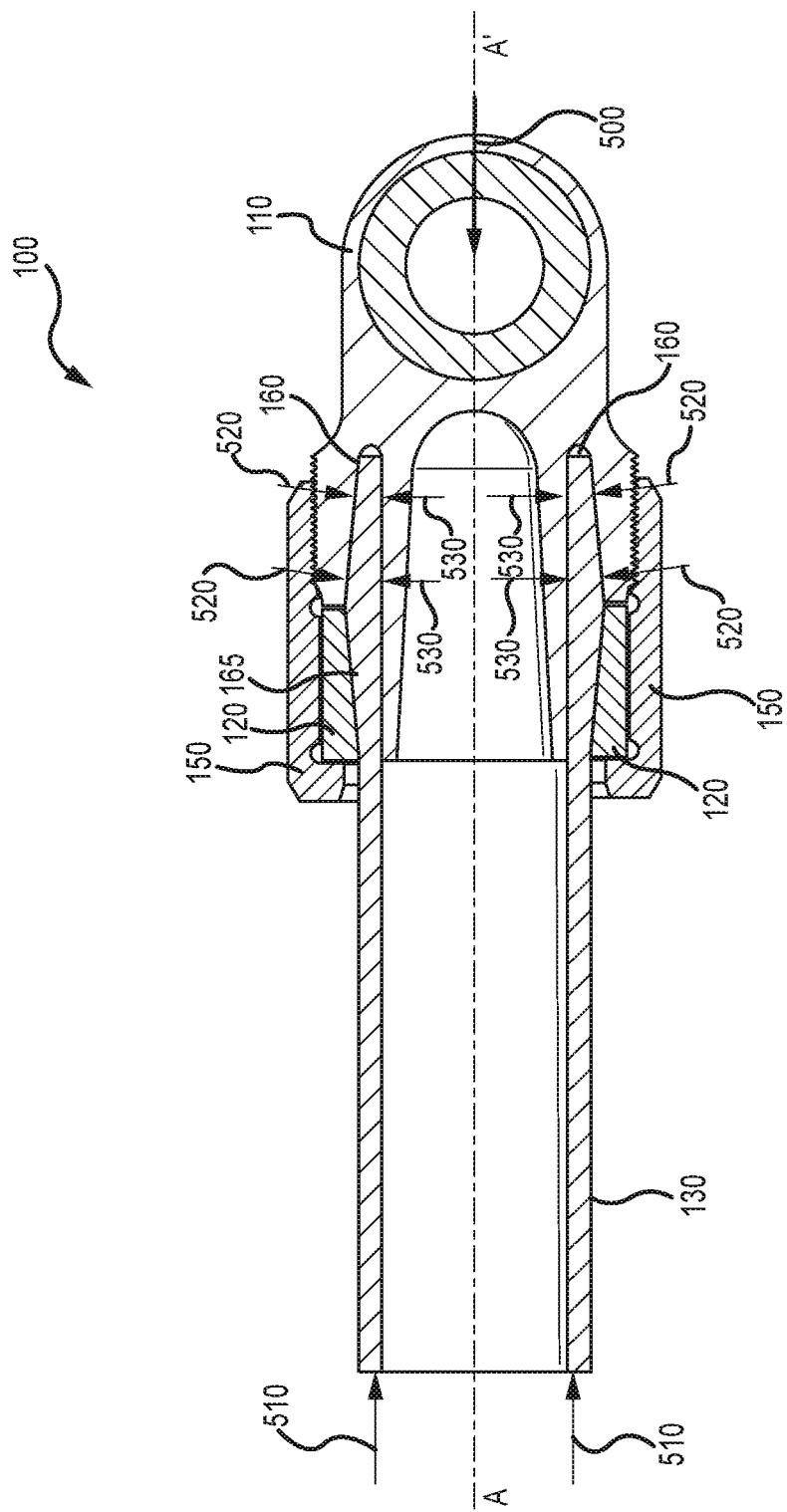
FIG. 5 illustrates a cross-sectional view of a composite tube assembly under a compressive load, in accordance with various embodiments.

With reference to FIG. 5, a composite tube assembly 100 under a compressive load 500, in accordance with various embodiments, is illustrated. In various embodiments, compressive load 500 may be applied to end fitting 110. At times when compressive load 500 is applied to end fitting 110, the compressive load 500 may be transferred to the second frustoconical portion 160 as an internal compressive load 530 and an outer compressive load 520. Accordingly, in various embodiments, the internal compressive load 530 and the outer compressive load 520 may create a tensile hoop stress on the composite tube 130 that results in longitudinal compressive load 510. Thus, in various embodiments, the composite tube 130 may react in response to compressive load 500 applied to end fitting 110.

Figure 7:
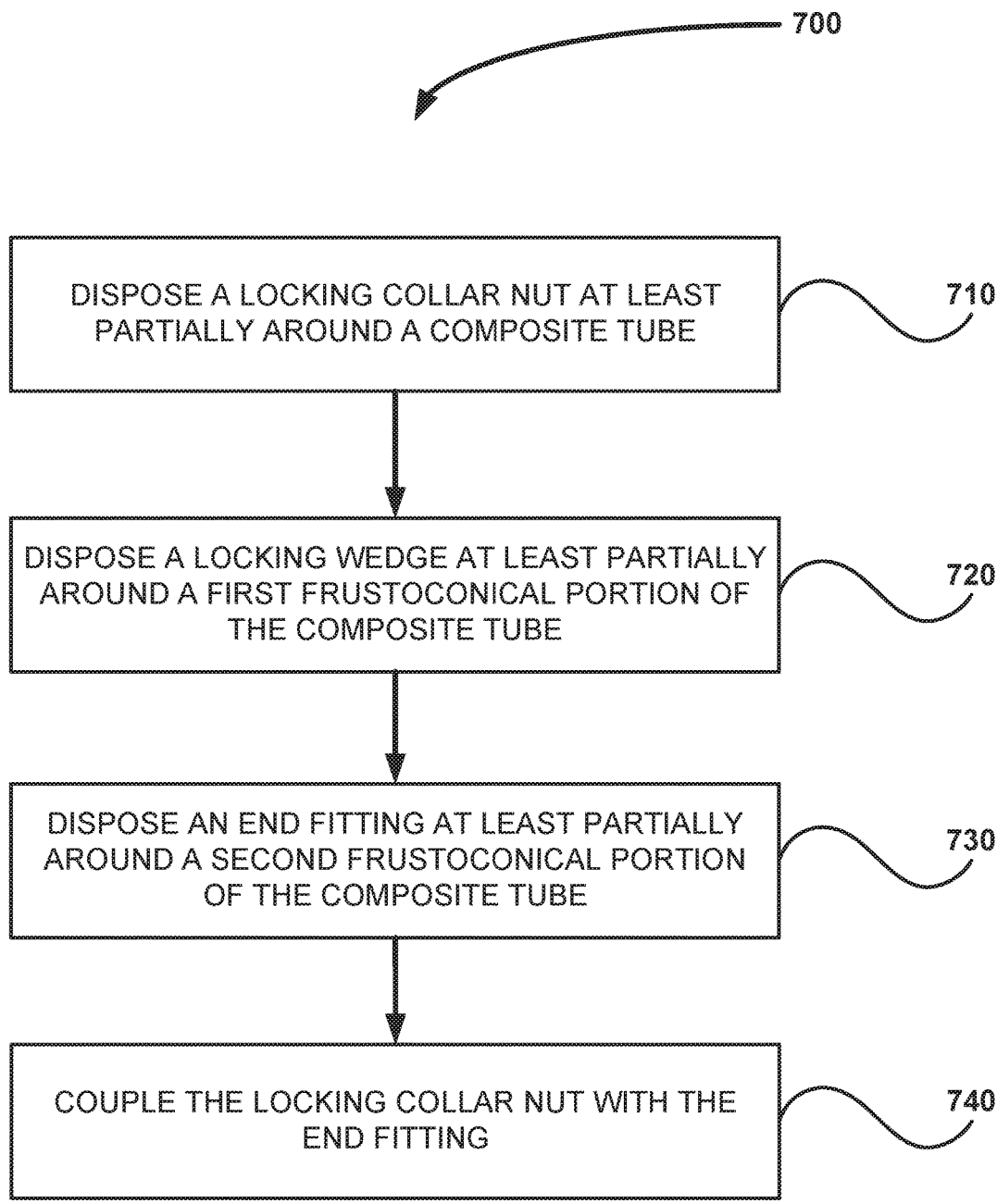
FIG. 7 illustrates a method of manufacture, in accordance with various embodiments.

With reference to FIG. 7, a method 700 of manufacturing a composite tube assembly 100, according to various embodiments is illustrated. The method 700 may comprise disposing a locking collar nut 150 at least partially around a composite tube 130 (step 710). In various embodiments and with temporary reference to FIGS. 2A and 2B, method 700 may be a method of assembling composite tube assembly 100. For example, in various embodiments, the composite tube assembly 100 may comprise a composite tube 130 that comprises a metallic insert 163, as illustrated in FIG. 2B.

With reference back to FIG. 7, in various embodiments, the method 700 may comprise disposing a locking wedge 120 at least partially around the first frustoconical portion 165 of the composite tube 130 (step 720). According to various embodiments, method 700 may comprise disposing an end fitting 110 at least partially around the second frustoconical portion 160 of the composite tube 130 (step 730). Method 700 may also comprise coupling the locking collar nut 150 with the end fitting 110 (step 740). According to various embodiments, the locking collar nut 150 may circumferentially surround the locking wedge 120 disposed around the first frustoconical portion 165 of the composite tube 130. In various embodiments, the locking collar nut 150 may be threadedly engaged to the end fitting 110.

Figure 8:
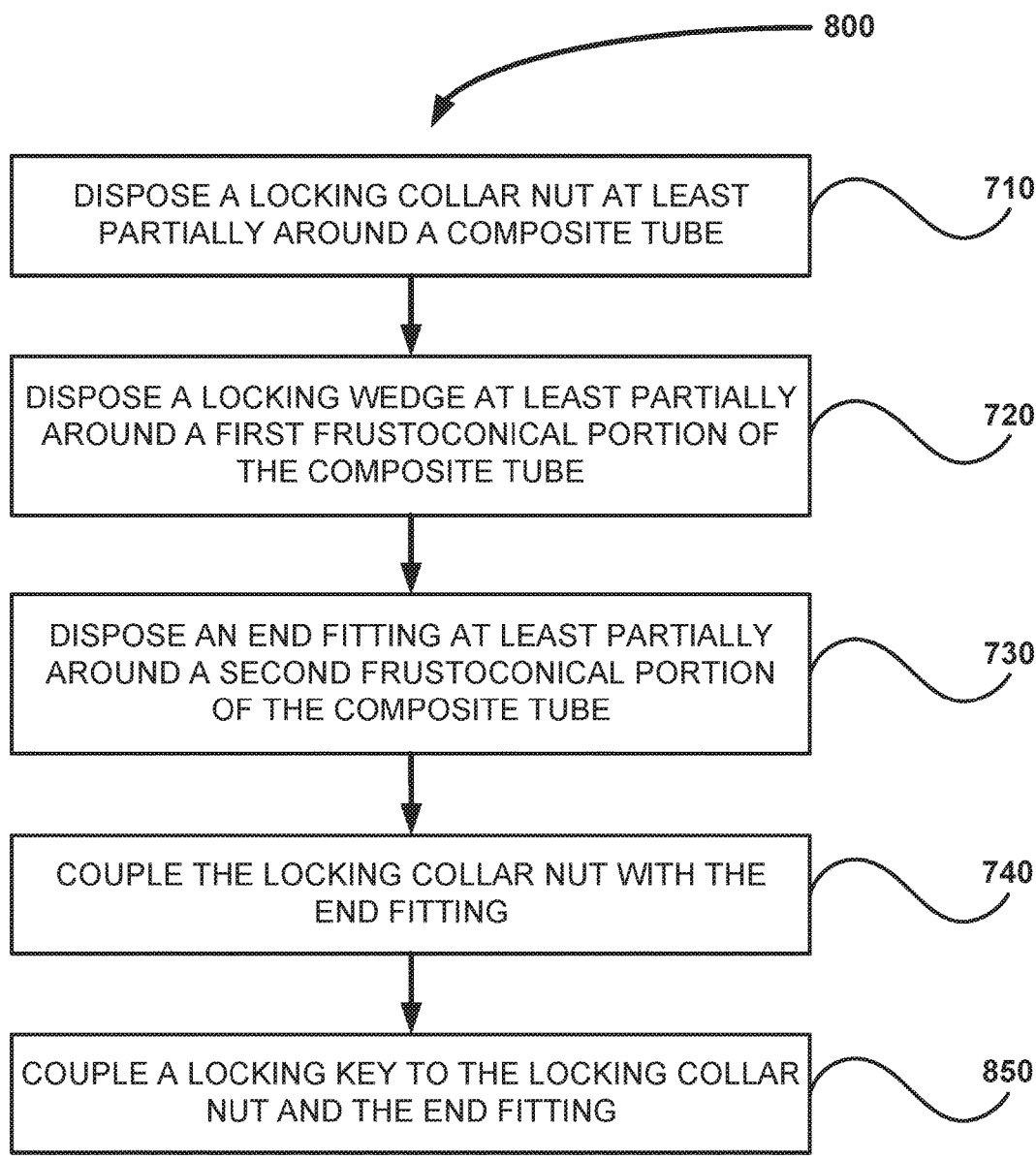
FIG. 8 illustrates a method of manufacture, in accordance with various embodiments.

With reference to FIG. 8, a method 800 of manufacturing a composite tube assembly 100 is illustrated, according to various embodiments. Method 800 may comprise disposing a locking collar nut 150 at least partially around a composite tube 130 (step 710). In various embodiments, method 800 may comprise disposing a locking wedge 120 at least partially around the first frustoconical portion 165 of the composite tube 130 (step 720). According to various embodiments, method 800 may comprise disposing an end fitting 110 at least partially around the second frustoconical portion 160 of the composite tube 130 (step 730). Method 800 may also comprise coupling the locking collar nut 150 with the end fitting 110 (step 740), in accordance with various embodiments. In various embodiments, method 800 may also comprise coupling a locking key 140 to the locking collar nut 150 and the end fitting 110 (step 850). For example, as illustrated in FIG. 1.

Figure 9:
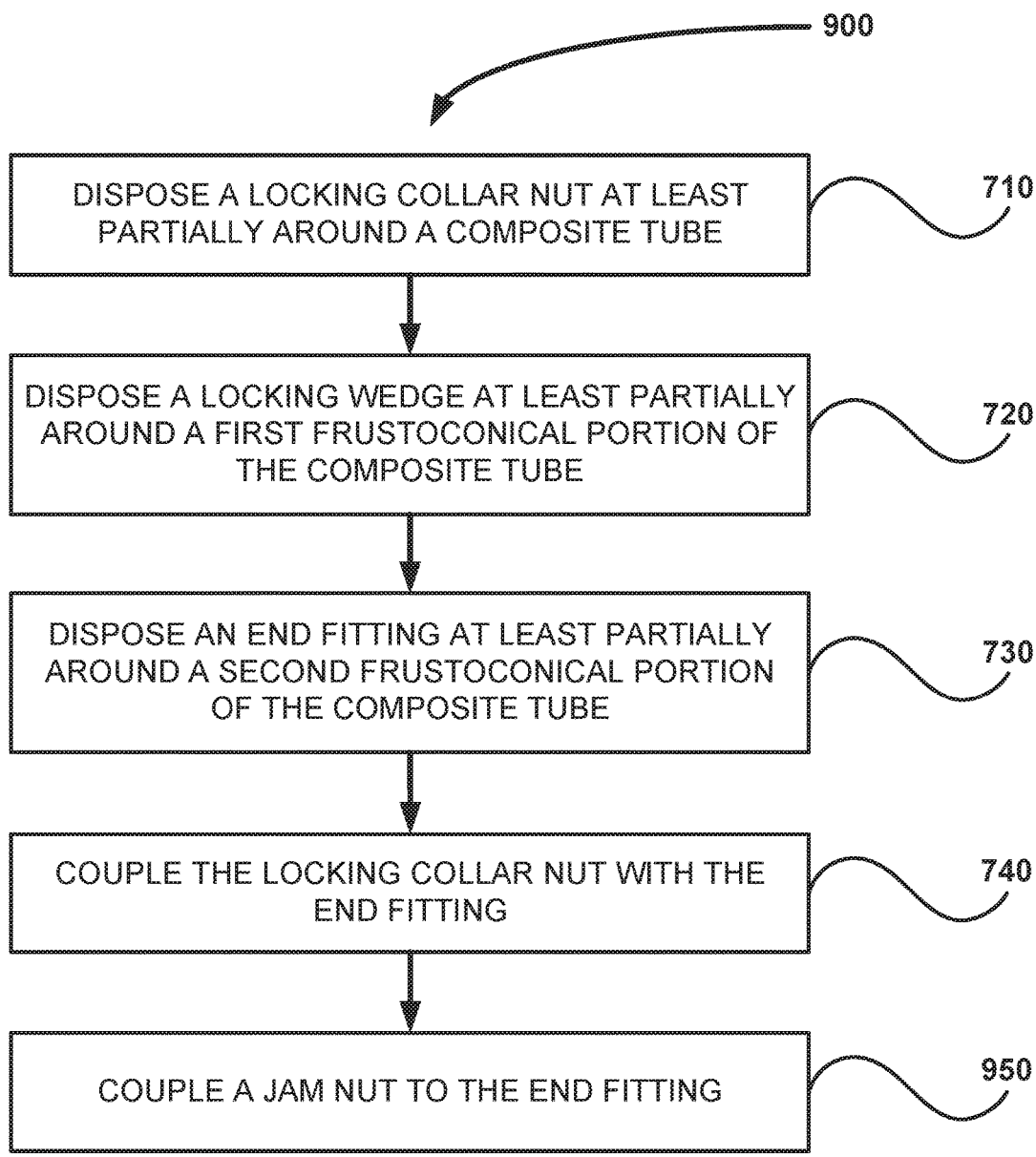
FIG. 9 illustrates a method of manufacture, in accordance with various embodiments.

With reference to FIG. 9, a method 900 of manufacturing a composite tube assembly 100 is illustrated, according to various embodiments. Method 900 may comprise disposing a locking collar nut 150 at least partially around a composite tube 130 (step 710). In various embodiments, a method 900 may comprise disposing a locking wedge 120 at least partially around the first frustoconical portion 165 of the composite tube 130 (step 720). According to various embodiments, a method 900 may comprise disposing an end fitting 110 at least partially around the second frustoconical portion 160 of the composite tube 130 (step 730). Method 900 may also comprise coupling the locking collar nut 150 with the end fitting 110 (step 740), in accordance with various embodiments. In various embodiments, the method 900 may also comprise coupling a jam nut 145 to the end fitting 110 (step 950), for example, as illustrated in FIG. 1. For example, the jam nut 145 may be threadedly engaged to the end fitting 110.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of manufacture comprising:
   disposing a locking collar nut at least partially around a composite tube,
   wherein the composite tube comprises a variable diameter portion comprising a first frustoconical portion and a second frustoconical portion,
   wherein a diameter of the composite tube at an interface between the first frustoconical portion and the second frustoconical portion is a maximum diameter value with respect to the first frustoconical portion and is a maximum diameter value with respect to the second frustoconical portion;
   disposing a locking wedge at least partially around the first frustoconical portion;
   disposing an end fitting at least partially around the second frustoconical portion; and
   coupling the locking collar nut with the end fitting;
   coupling a locking key to the locking collar nut and the end fitting; and
   coupling a jam nut to the end fitting, wherein the jam nut is threadingly engaged to the end fitting, and the locking collar nut circumferentially surrounds the locking wedge disposed around the first frustoconical portion.

2. The method of claim 1, wherein the locking collar nut is threadedly engaged to the end fitting.

* * * * *